United States Patent
R et al.

(10) Patent No.: US 11,391,250 B2
(45) Date of Patent: Jul. 19, 2022

(54) NATURALLY ASPIRATED COMMON RAIL DIESEL ENGINE MEETING ULTRA LOW PM EMISSION BY PASSIVE EXHAUST AFTER TREATMENT

(71) Applicant: MAHINDRA & MAHINDRA LTD., Chennai (IN)

(72) Inventors: Velusamy R, Chennai (IN); Dipankar Ray, Chennai (IN); Bhosale Sadanand, Chennai (IN); Hiranandani Pravesh, Chennai (IN); Rane Santosh, Chennai (IN); Suresh R, Chennai (IN); Dalvi Atmaram, Chennai (IN); Deepak S, Chennai (IN)

(73) Assignee: MAHINDRA & MAHINDRA LTD., Chennai (IN)

( * ) Notice: Subject to any disclaimer, the term of this patent is extended or adjusted under 35 U.S.C. 154(b) by 0 days.

(21) Appl. No.: 16/523,820

(22) Filed: Jul. 26, 2019

(65) Prior Publication Data

US 2019/0345900 A1 Nov. 14, 2019

Related U.S. Application Data

(63) Continuation-in-part of application No. 14/907,234, filed as application No. PCT/IN2014/000486 on Jul. 23, 2014, now abandoned.

(30) Foreign Application Priority Data

Jul. 23, 2013 (IN) .................. IN3271/CHE/2013

(51) Int. Cl.
*F02M 26/19* (2016.01)
*F02D 41/00* (2006.01)
(Continued)

(52) U.S. Cl.
CPC .......... *F02M 26/19* (2016.02); *B01D 53/945* (2013.01); *B01F 23/10* (2022.01);
(Continued)

(58) Field of Classification Search
CPC  B01D 53/944; B01D 53/945; B01D 53/9495; B01D 2255/1021;
(Continued)

(56) References Cited

U.S. PATENT DOCUMENTS 2,354,179 A * 7/1944 Blanc .................. F02M 25/00
123/568.17
2006/0060172 A1 * 3/2006 Liu .................. F02M 35/10118
123/568.17
(Continued)

*Primary Examiner* — Brandon D Lee
(74) *Attorney, Agent, or Firm* — Mannava & Kang, P.C.; Vinay Malik

(57) ABSTRACT

Systems (100, 200 and 300) and methods (400, 500 and 600) for controlling exhaust gas emissions from naturally aspirated engine are disclosed. The system (100, 200 and 300) includes an open loop exhaust gas recirculation flow to the engine. The system (100, 200 and 300) includes a diesel oxidation catalyst (102, 202 and 302) mounted on or near exhaust manifold (106, 206 and 306) of the engine. Furthermore, the system (100 and 200) includes an exhaust gas mixing conduit (114 and 214) inserted into air intake conduit (104 and 204). The system (100, 200 and 300) further includes an exhaust gas recirculation valve (110, 210 and 310) mounted on cold side or a hot side of EGR cooler. Furthermore, the system (100, 210 and 310) includes an electronic control unit to control exhaust gas recirculation valve (110, 210 and 310) along with various other engine calibration parameters.

4 Claims, 12 Drawing Sheets

(51) Int. Cl.
   *B01D 53/94*   (2006.01)
   *F02M 26/11*   (2016.01)
   *F02M 26/23*   (2016.01)
   *F02M 26/15*   (2016.01)
   *B01F 23/10*   (2022.01)
   *B01F 25/314*  (2022.01)

(52) U.S. Cl.
   CPC ...... *B01F 25/3143* (2022.01); *F02D 41/0077* (2013.01); *F02M 26/11* (2016.02); *F02M 26/15* (2016.02); *F02M 26/23* (2016.02); *B01D 2255/1021* (2013.01); *B01D 2255/1023* (2013.01)

(58) Field of Classification Search
   CPC .. B01D 2255/1023; B01F 3/02; B01F 5/0428; B01F 5/0461; B01F 5/0486; F02D 41/0065; F02D 41/0077; F02M 26/11; F02M 26/15; F02M 26/19; F02M 26/23; Y02T 10/40
   See application file for complete search history.

(56) References Cited

U.S. PATENT DOCUMENTS

| | | | |
|---|---|---|---|
| 2008/0103680 A1* | 5/2008 | Jacobson | F02D 41/0072 701/108 |
| 2013/0259779 A1* | 10/2013 | Kim | B01J 37/031 423/213.7 |
| 2018/0266366 A1* | 9/2018 | Zhang | F02M 26/21 |
| 2019/0277225 A1* | 9/2019 | Chen | F02M 26/23 |

* cited by examiner

| Oxidizing organic volatile fractions from the engine, by an oxidation catalyst (102) adapted to be coupled to an exhaust manifold (106) of the engine, step 402 |

↓

| Controlling the exhaust gas flow to an exhaust gas mixing conduit (114) through an exhaust gas recirculation valve (110) by providing at least one signal from an electronic control unit (113) to the exhaust gas recirculation valve (110), step 404 |

↓

| Mixing the exhaust gases with fresh air in an air intake conduit (104), by inserting the exhaust gas mixing conduit (114) into the air intake conduit (104) and allowing exhaust flow from an angular exhaust gas outlet (114A) of the exhaust gas mixing conduit (114) to the air intake conduit (104), step 406 |

Oxidizing organic volatile fractions from the engine, by an oxidation catalyst (302) adapted to be coupled to an exhaust manifold (306) of the engine, step 602

Controlling the exhaust gas flow to an exhaust gas mixing conduit (314) through an exhaust gas recirculation valve (310) by providing at least one signal from an electronic control unit (313) to the exhaust gas recirculation valve (310), step 604

Mixing the exhaust gases with fresh air in the air intake venturi conduit (304), by allowing exhaust gas flow from the exhaust gas mixing conduit (214) to a plurality of plurality of exhaust gas receiving portion (304Tg) provided to a throat portion (304T) of the air intake venturi conduit (304), step 606

NATURALLY ASPIRATED COMMON RAIL DIESEL ENGINE MEETING ULTRA LOW PM EMISSION BY PASSIVE EXHAUST AFTER TREATMENT

CROSS REFERENCES TO RELATED APPLICATIONS

The present application is a Continuation-In-Part of commonly assigned and co-pending U.S. application Ser. No. 14/907,234, filed on Jan. 22, 2016, which is a national stage filing under 35 U.S.C. § 371 of PCT Application Serial Number PCT/IN2014/000486, having an international filing date of Jul. 23, 2014, which claims foreign priority to Indian Application Serial Number 3271/CHE/2013, filed Jul. 23, 2013, entitled "Naturally Aspirated Common Rail Diesel Engine Meeting Ultra Low PM Emission by Passive Exhaust After Treatment", the disclosures of which are hereby incorporated by reference in their entireties.

FIELD OF INVENTION

The embodiments herein relate to an emission control system for an internal combustion engine, and more particularly, to systems and methods for controlling exhaust gas emissions from a naturally aspirated engine, which minimizes nitrogen oxides (NOx) and other emissions while minimizing particulate matter emissions from the engine.

BACKGROUND OF INVENTION

The catalytic treatment of various gaseous streams containing minor amounts of atmospheric pollutants such as hydrocarbons, carbon monoxide and nitrogen oxides has been practiced on a commercial basis for a number of years. It is desired to convert these pollutants to the less noxious carbon dioxide, water and nitrogen. Generally, the gaseous streams which are treated are effluent or waste gas streams which are discharged into the atmosphere in large quantities, and a salient example of such treatments is the high temperature contact of the exhaust gases of internal combustion engines with a catalyst loaded with precious metals like Palladium (Pd), Platinum (Pt), Rhodium (Rh) etc. Initially, most attention was directed on a commercial basis to the oxidation of the hydrocarbon and carbon monoxide of the gaseous streams, and generally the treating system contained an excess of oxygen based on complete combustion of these gaseous streams to carbon dioxide and water. Since the catalysts employed also had a capability of promoting reduction reactions, there may have occurred during the treatment some reduction of nitrogen oxides into nitrogen and/or ammonia, although the presence of the latter gaseous stream in the products is undesirable.

Further exhaust gas re-circulation is a technique commonly used for controlling the generation of undesirable pollutant gases in the operation of internal combustion engines. This technique has proven particularly useful in internal combustion engines used in motor vehicles such as passenger cars, light duty trucks, and other on-road motor equipment. The exhaust gas re-circulation technique primarily involves the re-circulation of exhaust gas by-products into the intake air supply of the internal combustion engine. This exhaust gas thus reintroduced in to the engine cylinder reduces the concentration of oxygen therein, which in turn lowers the maximum combustion temperature within the cylinder and slows the chemical reaction of the combustion process, decreasing the formation of nitrous oxide. Furthermore, the exhaust gases typically contain a portion of unburned hydrocarbon which is burned on its reintroduction into the engine cylinder, which further reduces the emission of exhaust gas by-products which would be emitted as undesirable pollutants from the internal combustion engine.

Further, at present a number of exhaust gas-treating systems containing a plurality of catalysts have been proposed, and the operations often involve the use of one catalyst under reducing conditions to maximize the conversion of nitrogen oxides to nitrogen, and a separate catalyst is employed under oxidizing conditions to maximize the conversion of carbon monoxide and hydrocarbons to carbon dioxide and water. Such systems are expensive and, therefore, undesirable, particularly where the amount of space available for containing the catalytic equipment is limited as is usually the case with off-highway vehicles. However, as time passes the levels of pollutants that may be charged acceptably into the atmosphere are being lowered to the extent that both the oxidation of carbon monoxide and hydrocarbons and the reduction of nitrogen oxides must be accomplished to a high degree, if government regulations are to be satisfied. It is, therefore, quite important to develop catalytic systems for treating such gases most effectively and under economically attractive conditions.

OBJECT OF INVENTION

The principal object of this invention is to provide systems for controlling exhaust gas emissions from a naturally aspirated engine.

Another object of the invention is to provide methods for controlling exhaust gas emissions from a naturally aspirated engine.

Another object of the invention is to provide open loop exhaust gas recirculation systems for controlled supply of exhaust gas to an intake of a naturally as pirated diesel engine.

A further object of the invention is to provide emission control systems which will optimize field fuel consumption with good drivability while concurrently minimizing emissions such as nitrous oxide and minimizing the release of undesirable particulate matter.

Another object of the present invention is to provide emission control systems which will provide more accurate control over the exhaust gas re-circulation.

Yet another object of the invention is to provide methods of controlling emission of a naturally aspirated diesel engine by providing a diesel oxidation catalyst in exhaust gas flow path.

These and other objects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

SUMMARY

Accordingly systems for controlling exhaust gas emissions from a common rail naturally aspirated engine having diesel oxidation catalyst (DOC) in after treatment with an open loop control of injected fuel and exhaust gas recirculation flow (EGR) is disclosed. The systems comprise integration of close coupled diesel oxidation catalyst (DOC) on exhaust manifold and EGR path is connected between exhaust and intake side by EGR pipe. EGR gas enters into air intake conduit through an exhaust gas mixing conduit which facilitates uniform mixing of EGR gas with fresh air and this homogeneous charge enters individual cylinder ports. The systems further includes an Electronic Exhaust Gas Recirculation valve (EEGR) which controls exhaust gas flow based on optimized FUR map by Electronic Control Unit (ECU) of the engine.

Also, methods for controlling exhaust gas emissions in a naturally aspirated engine having an open loop EGR control are disclosed. The methods includes mapping an injected fuel quantity and demanded EGR valve position as function of engine speed & throttle demand. Actual EEGR valve position is controlled by a position feedback mechanism. Here the systems works as an open loop system where emission control is done through calibrated base and/or corrections maps. The correction maps are selected based on engine coolant temperature, atmospheric pressure and temperature, etc.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which:

FIG. 4 depicts a flowchart indicating a method for controlling exhaust gas emissions from the naturally aspirated engine, according to the first embodiment as disclosed herein;

FIG. 11 depicts a flowchart indicating a method for controlling exhaust gas emissions from the naturally aspirated engine, according to the third embodiment as disclosed herein;

DETAILED DESCRIPTION OF INVENTION

Figure 1:
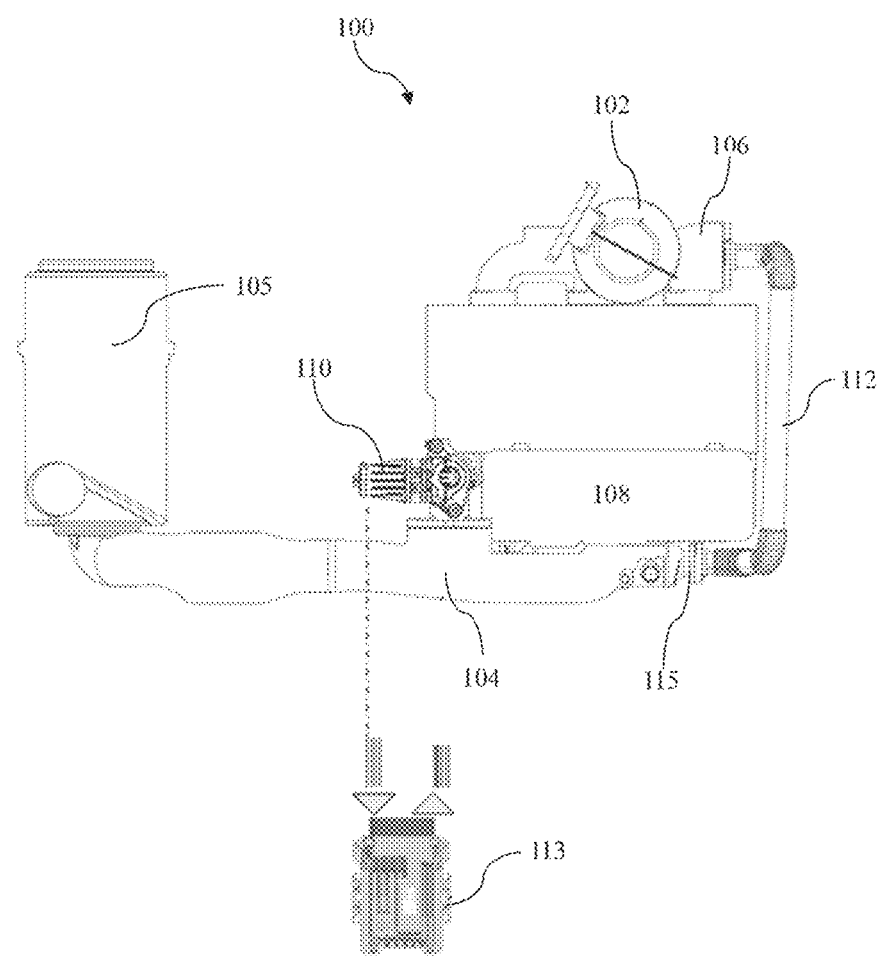
FIG. 1 depicts a schematic view of an emission control system in communication with a naturally aspirated engine, according to a first embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. For example, it should be noted that while some embodiments are explained with respect to systems for controlling emissions of naturally aspirated engine using a catalyst, any other engine may also incorporate the subject matter of the invention with little or no modifications. Accordingly, the examples should not be construed as limiting the scope of the embodiments herein.

The embodiments herein achieve systems for controlling exhaust gas emissions from a naturally aspirated diesel engine. The embodiments herein achieve emission control systems with optimum field fuel consumption and good vehicle drivability while concurrently minimizing exhaust gas emissions such as nitrous oxide and minimizing the release of undesirable particulate matter. The embodiments herein achieve methods of controlling exhaust gas emission of a naturally aspirated diesel engine by providing a diesel oxidation catalyst in exhaust gas flow path. Referring now to the drawings, and more particularly to FIGS. 1 through 12b, where similar reference characters denote corresponding features consistently throughout the figures, there are shown embodiments.

FIG. 1 depicts a schematic view of emission control system (100) in communication with a naturally aspirated engine, according to a first embodiment as disclosed herein. In the first embodiment, the system (100) includes a diesel oxidation catalyst (102), an air intake conduit (104), an exhaust manifold (106), an intake manifold (108), an exhaust gas recirculation valve (110), an exhaust gas recirculation pipe (112), an electronic control unit (113), an exhaust gas mixing conduit (114) and an exhaust gas recirculation cooler (115). For the purpose of this description and ease of understanding, the system (100) is explained herein with reference to controlling exhaust gas emissions from a naturally aspirated common rail diesel engine. However, it is also within the scope of this invention to practice/implement the system (100) for controlling exhaust gas emissions from any other type of engine without otherwise deterring the intended function of the system (100) as can be deduced from the description and corresponding drawings.

The diesel oxidation catalyst (102) is connected to the exhaust manifold (106). The diesel oxidation catalyst (102) is mounted on or near the exhaust manifold (106) to oxidize organic volatile fractions of exhaust emissions from engine. This oxidation reaction in diesel oxidation catalyst (102) helps to reduce tail pipe hydrocarbons (HC) and carbon mono oxide (CO) emissions as well it reduces particulate matter (PM) due to oxidation of volatile organic fractions. The close coupled diesel oxidation catalyst (102) mounted on exhaust manifold (106) helps for faster activation of diesel oxidation catalyst even at light loads. A combination of precious metals (Platinum (Pt.)+Palladium (Pd.)) in right proportion and loading ensures meeting legal emission demand over the entire useful life of the engine. The normal exhaust gas temperature for naturally aspirated diesel engine is 200-650 degree Celsius. The light-off temperature of diesel oxidation catalyst is around 250 degree Celsius. Palladium (Pd.) gives better thermal stability at high gas temperature operation whereas Platinum (Pt.) helps for faster activation at light load. For this application, a predetermined ratio of Pt:Pd combination is used for controlling the particulate matter (PM) emissions throughout the engine operation.

One end of the air intake conduit (104) is coupled to the air cleaner (105, as shown in FIG. 1) and another end of the air intake conduit (104) is connected to the intake manifold (108). The intake conduit (104) is adapted to allow fresh air from the air cleaner (105) to the intake manifold (108). The intake conduit (104) receives re-circulated exhaust gas from the exhaust gas mixing conduit (114) and the intake conduit (104) facilitates in mixing of the exhaust gas with the fresh air.

The exhaust manifold (106) is provided in fluid communication with the exhaust gas recirculation cooler (115) through the exhaust gas recirculation pipe (112). One end of the exhaust manifold (106) is connected to an exhaust side of the engine and the other end of the exhaust manifold (106) is connected to the exhaust gas recirculation pipe (112). The intake manifold (108) is provided in fluid communication with the air cleaner (105) through the air intake conduit (104). One end of the intake manifold (108) is connected to the air intake conduit (104) and the other ends of the intake manifold (108) are connected to an intake side of the engine.

The exhaust gas recirculation valve (110) is provided in fluid communication with the air intake conduit (104) through the exhaust gas mixing conduit (114). The exhaust gas recirculation valve (110) is provided in fluid communication with the exhaust gas recirculation cooler (115). The exhaust gas recirculation valve (110) provided near a cold side or a hot side of the exhaust gas recirculation cooler (115). The exhaust gas recirculation valve (110) is adapted to control the flow of exhaust gas recirculation to the air intake conduit (104) based on the information received from the electronic control unit (113). The flow control of exhaust gas recirculation is open loop. The exhaust gas recirculation valve (110) opening is based on calibrated exhaust gas recirculation map controlled through electronic control unit (113) to maintain the level of particulates emitted in the exhaust gas within prescribed limits. One end of the exhaust gas recirculation pipe (112) is connected to the exhaust manifold (106) and the other end of the exhaust gas recirculation pipe (112) is connected to the exhaust gas recirculation cooler (115).

The electronic control unit (113) specifically includes open loop control logic to provide a regulated flow of exhaust gas recirculation into the air intake conduit (104) and injected fuel quantity control depending on engine speed, throttle demand, coolant temperature and atmospheric pressure etc. For engine out emission control, a suitable compression ratio is selected. The bowl shape, injector nozzle, injection pressures, injections parameters and cylinder head swirl are chosen after studying interaction effect with intention to minimize engine out emissions. The volatile organic fractions of engine out emissions are further oxidized in diesel oxidation catalyst (102). Tail pipe emissions under steady state (NRSC), NTE and transient cycle (NRTC) are controlled by combination of engine hardware and with calibration of injection parameters and exhaust gas recirculation rate. Corrections in base map are done based on coolant temperature and ambient pressure. Emission control is achieved with open loop system. In an embodiment a transient calibration is performed on said engine to get optimum NOx/PM trade off throughout the engine map meeting the cycle BSFC targets. Rail pressure, start of main injection, start of pilot injection and the quantity, exhaust gas recirculation rate over entire engine map, and water temperature based corrections in exhaust gas recirculation flow rate are tuned to calibrate the engine.

The exhaust gas recirculation cooler (115) is provided in fluid communication with the air intake conduit (104) through the exhaust gas recirculation valve (110) and the exhaust gas mixing conduit (114). One end of the exhaust gas recirculation cooler (115) is connected to the exhaust manifold (106) and the other end of the exhaust gas recirculation cooler (115) is coupled to the exhaust gas recirculation valve (110).

Figure 2A:
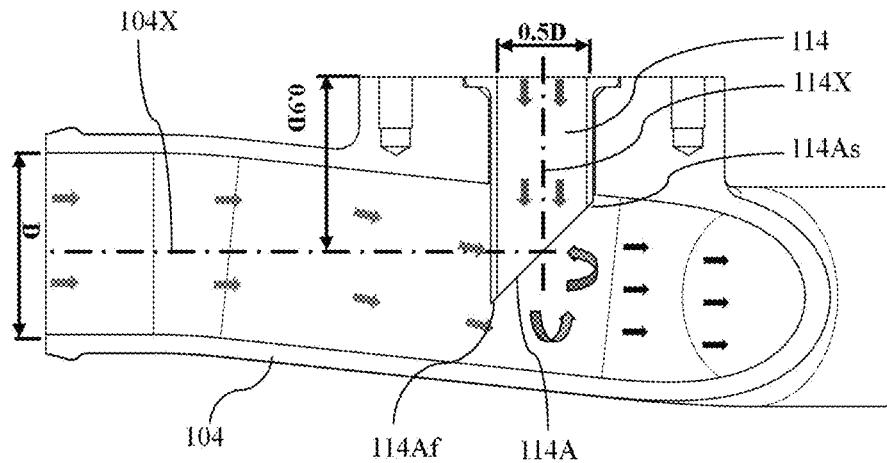
FIGS. 2a and 2b depict cross sectional views of an air intake conduit and an exhaust gas mixing conduit in assembled condition, according to the first embodiment as disclosed herein.
Figure 2B:
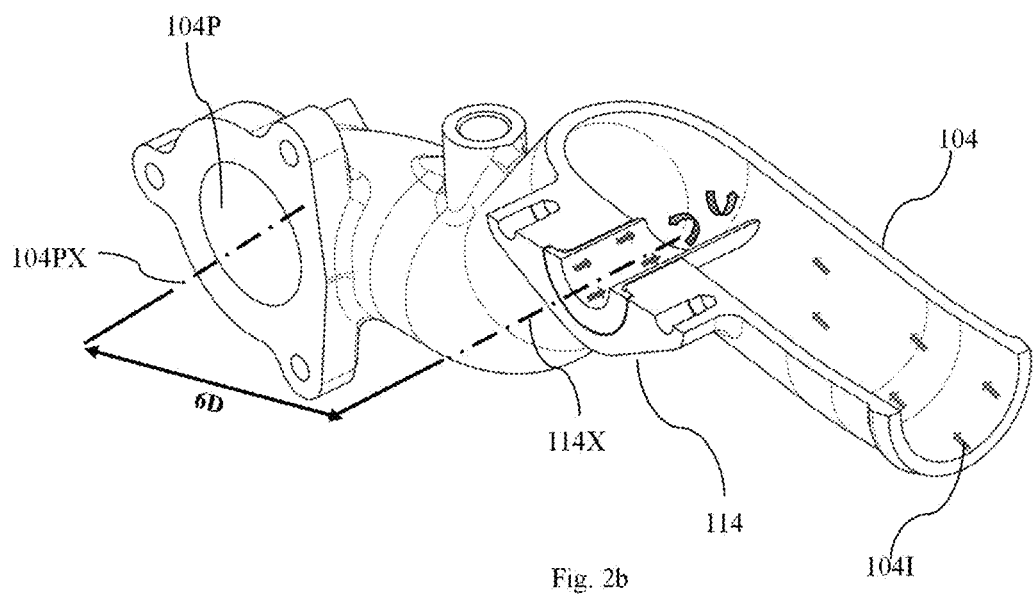

FIGS. 2a and 2b depict cross sectional views of an air intake conduit (104) and an exhaust gas mixing conduit (114) in assembled condition, according to the first embodiment as disclosed herein. The exhaust gas mixing conduit (114) receives exhaust gas from the exhaust gas recirculation cooler (115) through the exhaust gas recirculation valve (110). One end of the exhaust gas mixing conduit (114) is coupled to the exhaust gas recirculation valve (110) and the other end of the exhaust gas mixing conduit (114) is connected to the air intake conduit (104). The exhaust gas mixing conduit (114) is adapted to facilitate uniform mixing of exhaust gas with fresh air in the air intake conduit (104). For example, the exhaust gas mixing conduit (114) is adapted to introduce the exhaust gas at center of the air intake conduit (104) for uniform mixing of exhaust gas with fresh air in the air intake conduit (104). The exhaust gas mixing conduit (114) includes a body (114B) and a flange (114F). At least a portion of the body (114B) of the exhaust gas mixing conduit (114) is disposed inside the air intake conduit (104).

Figure 3A:
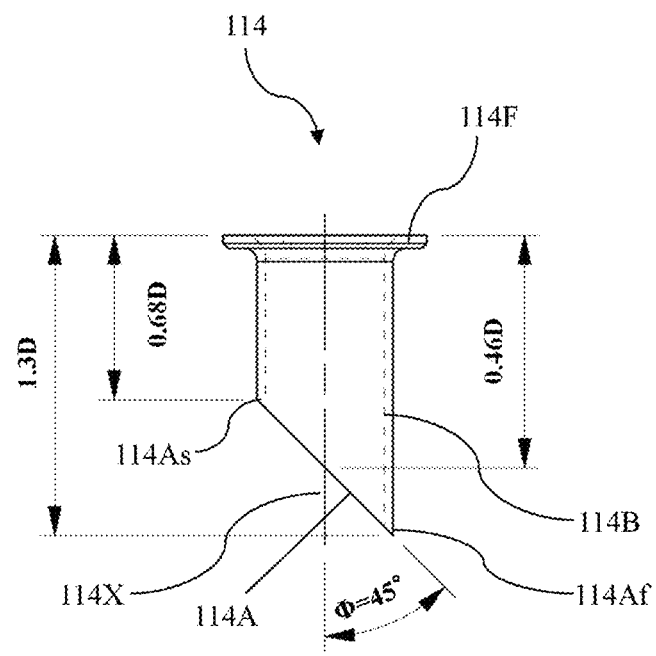
FIG. 3a depicts a front view of the exhaust gas mixing conduit, according to the first embodiment as disclosed herein.
Figure 3B:
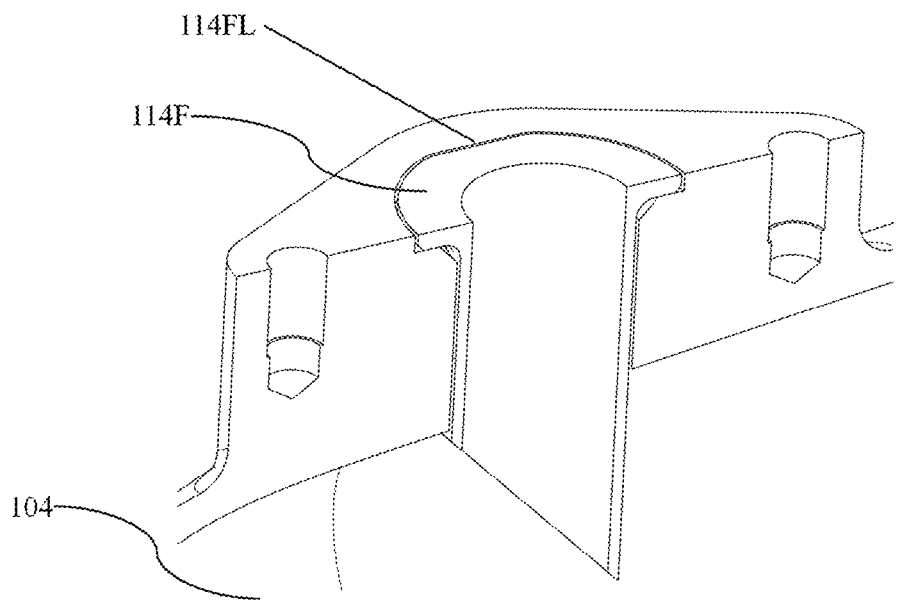
FIG. 3b depicts another cross sectional view of the air intake conduit and the exhaust gas mixing conduit in assembled condition, according to the first embodiment as disclosed herein.

FIG. 3b depicts another cross sectional view of the air intake conduit (104) and the exhaust gas mixing conduit (114) in assembled condition, according to the first embodiment as disclosed herein. The flange (114F) of the exhaust gas mixing conduit (114) is adapted to facilitate mounting of the exhaust gas mixing conduit (114) onto the air intake conduit (104). The flange (114F) of the exhaust gas mixing conduit (114) includes a plurality of locking portions (114FL) adapted to secure the exhaust gas mixing conduit (114) with the air intake conduit (104). It is also within the scope of this invention to secure the exhaust gas mixing conduit (114) with the air intake conduit (104) by using fasteners or any other connecting process. For the purpose of this description and ease of understanding, each locking portion (114L) of the exhaust gas mixing conduit (114) is a planar portion provided. In the circumference of the flange (114F).

In an embodiment, the exhaust gas mixing conduit (114) includes an angular exhaust gas outlet (114A, as shown in FIG. 2*a* and FIG. 3*a*) adapted to facilitate uniform mixing of exhaust gas with fresh air in the air intake conduit (104), where the angular exhaust gas outlet (114A) is provided at the end of the body (114B). One end (114Af) of the angular exhaust gas outlet (114A) is disposed away from another end (114As) of the angular exhaust gas outlet (114A). In an embodiment, the exhaust gas mixing conduit (114) is being cut at a predefined angle with respect to a central axis (114X, as shown in FIG. 3*a*) of the exhaust gas mixing conduit (114) therein to form the angular exhaust gas outlet (114A). For example, the exhaust gas mixing conduit (114) is being cut at 45 degree with respect to the central axis (114X) of the exhaust gas mixing conduit (114) therein to form the angular exhaust gas outlet (114A). However, it is also within the scope of this invention to cut the exhaust gas mixing conduit (114) at any other angle without otherwise deterring the intended function of the angular exhaust gas outlet (114A) as can be deduced from the description and corresponding drawings. The angular exhaust gas outlet (114A) is facing opposite to the flow of fresh air from the air intake conduit (104).

FIG. 3*a* depicts a front view of the exhaust gas mixing conduit (114), according to the first embodiment as disclosed herein. In an embodiment, an inner diameter of the exhaust gas mixing conduit (114) is half the inner diameter (D, as shown in FIG. 2*a*) of the air intake conduit (104). It is also within the scope of this invention to provide the inner diameter of the exhaust gas mixing conduit (114) in any other number. The distance between the point of intersection of the central axis (114X) of the exhaust gas mixing conduit (114) and a central axis (104X, as shown in FIG. 2*a*) of the air intake conduit (104) is 0.9 of the inner diameter (D) of the air intake conduit (104). It is also within the scope of this invention to change the distance between the point of intersection of the central axis (114X) of the exhaust gas mixing conduit (114) and the central axis (104X) of the air intake conduit (104). In an embodiment, an overall length of the exhaust gas mixing conduit (114) is 1.3 times the inner diameter (D) of the air intake conduit (104). It is also within the scope of this invention to provide the overall length of the exhaust gas mixing conduit (114) in any other number. In an embodiment, a distance between the flange (114F) of the exhaust gas mixing conduit (114) and the end (114As) of the angular opening (114A) is 0.68 of the inner diameter (D) of the air intake conduit (104). It is also within the scope of this invention to change the distance between the flange (114F) of the exhaust gas mixing conduit (114) and the end (114As) of the angular opening (114A). In an embodiment, a distance between the flange (114F) and the center of the angular exhaust gas outlet (114A) of the exhaust gas mixing conduit (114) is 0.46 of the inner diameter (D) of the air intake conduit (104). In an embodiment, a mixing length between a central axis (104PX, as shown in FIG. 2*b*) of an outlet (104P, as shown in FIG. 2*b*) of the air intake conduit (104) and the central axis (114X) of the exhaust gas mixing conduit (114) is at least 6 times the inner diameter (D) of the air intake conduit (104). It is also within the scope of this invention to change the mixing length between the air intake conduit (104) and the exhaust gas mixing conduit (114). The aforementioned dimensions are derived based on the inner diameter (D) of the air intake conduit (104) to achieve flow uniformity index of >85%.

FIG. 4 depicts a flowchart indicating a method (400) for controlling exhaust gas emissions from the naturally aspirated engine, according to the first embodiment as disclosed herein. For the purpose of this description and ease of understanding, the method (400) is explained herein below with reference to controlling exhaust gas emissions from a naturally aspirated common rail diesel engine. It is also within the scope of the invention to practice/implement the entire steps of the method (400) in the same manner or in a different manner or with omission of at least one step of the method (400) or with any addition of at least one step to the method (400) for controlling exhaust gas emissions from any other type of engines. In an embodiment, the method (400) includes, oxidizing organic volatile fractions from the engine, by an oxidation catalyst (102) adapted to be coupled to an exhaust manifold (106) of the engine, step 402; controlling the exhaust gas flow to an exhaust gas mixing conduit (114) through an exhaust gas recirculation valve (110) by providing at least one signal from an electronic control unit (113) to the exhaust gas recirculation valve (110), step 404; mixing the exhaust gases with fresh air in an air intake conduit (104), by inserting the exhaust gas mixing conduit (114) into the air intake conduit (104) and allowing exhaust flow from an angular exhaust gas outlet (114A) of the exhaust gas mixing conduit (114) to the air intake conduit (104), step 406. The method (400) includes selecting the oxidation catalyst (102) from a combination of precious metal, wherein the precious metal comprises platinum (Pt) and palladium (Pd).

Figure 5:
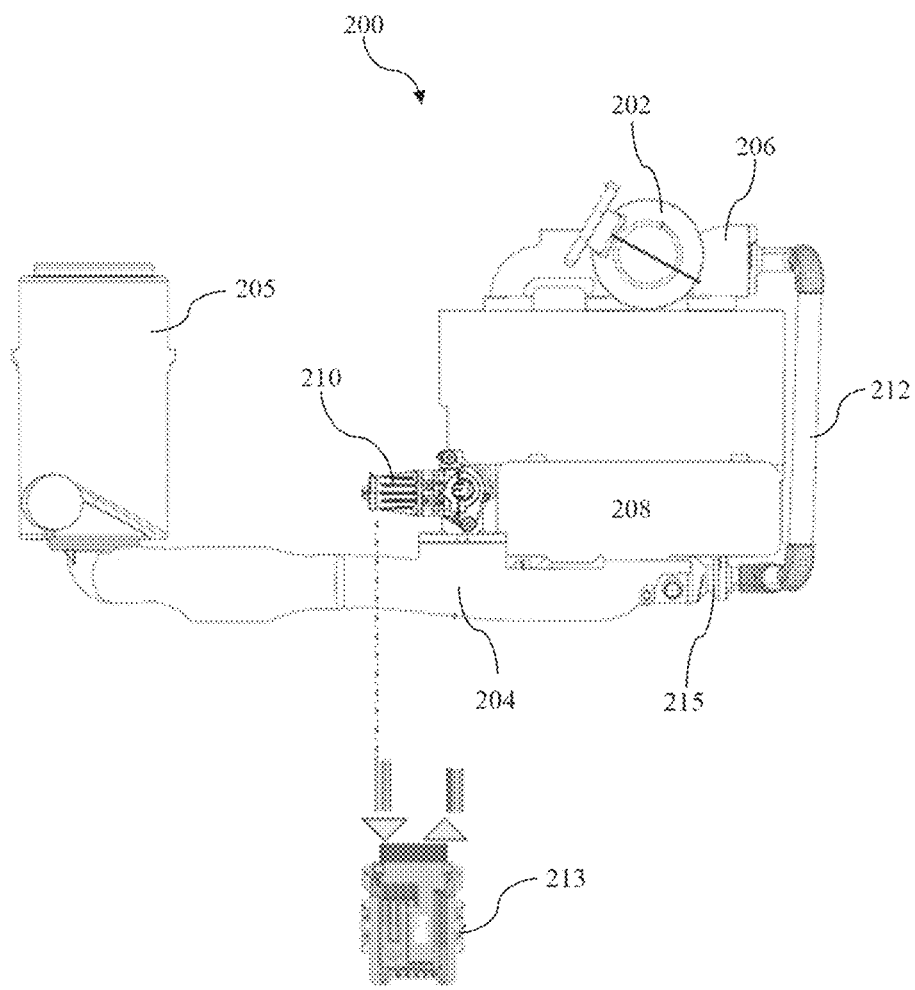
FIG. 5 depicts a schematic view of an emission control system in communication with a naturally aspirated engine, according to a second embodiment as disclosed herein.

FIG. 5 depicts a schematic view of an emission control system (200) in communication with a naturally aspirated engine, according to a second embodiment as disclosed herein. In the second embodiment, the system (200) includes a diesel oxidation catalyst (202), an air intake conduit (204), an exhaust manifold (206), an intake manifold (208), an exhaust gas recirculation valve (210), an exhaust gas recirculation pipe (212), an electronic control unit (213), an exhaust gas mixing conduit (114) and an exhaust gas recirculation cooler (215). For the purpose of this description and ease of understanding, the system (200) is explained herein with reference to controlling exhaust gas emissions from a naturally aspirated common rail diesel engine. However, it is also within the scope of this invention to practice/implement the system (200) for controlling exhaust gas emissions from any other type of engine without otherwise deterring the intended function of the system (100) as can be deduced from the description and corresponding drawings.

The diesel oxidation catalyst (202) is connected to the exhaust manifold (206). The diesel oxidation catalyst (202) is mounted on or near the exhaust manifold (206) to oxidize organic volatile fractions of exhaust emissions from engine. This oxidation reaction in diesel oxidation catalyst (202) helps to reduce tail pipe hydrocarbons (HC) and carbon mono oxide (CO) emissions as well it reduces particulate matter (PM) due to oxidation of volatile organic fractions. The close coupled diesel oxidation catalyst (202) mounted on exhaust manifold (206) helps for faster activation of diesel oxidation catalyst even at light loads. A combination of precious metals (Platinum (Pt.)+Palladium (Pd.)) in right proportion and loading ensures meeting legal emission demand over the entire useful life of the engine. The normal exhaust gas temperature for naturally aspirated diesel engine is 200-650 degree Celsius. The light-off temperature of diesel oxidation catalyst is around 250 degree Celsius, Palladium (Pd.) gives better thermal stability at high gas temperature operation whereas Platinum (Pt.) helps for faster activation at light load. For this application, a predetermined ratio of Pt:Pd combination is used for controlling the particulate matter (PM) emissions throughout the engine operation.

One end of the air intake conduit (204) is coupled to the air cleaner (205, as shown in FIG. 5) and another end of the air intake conduit (204) is connected to the intake manifold (208). The air intake conduit (204) is adapted to allow fresh air from the air cleaner (205) to the intake manifold (208). The intake conduit (204) receives re-circulated exhaust gas from the exhaust gas mixing conduit (214) and the air intake conduit (204) facilitates in mixing of the exhaust gas with the fresh air.

The exhaust manifold (206) is provided in fluid communication with the exhaust gas recirculation cooler (215) through the exhaust gas recirculation pipe (212). One end of the exhaust manifold (206) is connected to an exhaust side of the engine and the other end of the exhaust manifold (206) is connected to the exhaust gas recirculation pipe (212). The intake manifold (208) is provided in fluid communication with the air cleaner (205) through the air intake conduit (204). One end of the intake manifold (208) is connected to the air intake conduit (204) and the other ends of the intake manifold (208) are connected to an intake side of the engine.

The exhaust gas recirculation valve (210) is provided in fluid communication with the air intake conduit (204) through the exhaust gas mixing conduit (214). The exhaust gas recirculation valve (210) is provided in fluid communication with the exhaust gas recirculation cooler (215). The exhaust gas recirculation valve (210) provided near a cold side or a hot side of the exhaust gas recirculation cooler (215). The exhaust gas recirculation valve (210) is adapted to control the flow of exhaust gas recirculation to the air intake conduit (204) based on the information received from the electronic control unit (213). The flow control of exhaust gas recirculation is open loop. The exhaust gas recirculation valve (210) opening is based on calibrated exhaust gas recirculation map controlled through electronic control unit (213) to maintain the level of particulates emitted in the exhaust gas within prescribed limits. One end of the exhaust gas recirculation pipe (212) is connected to the exhaust manifold (206) and the other end of the exhaust gas recirculation pipe (212) is connected to the exhaust gas recirculation cooler (215).

The electronic control unit (213) specifically includes open loop control logic to provide a regulated flow of exhaust gas recirculation into the air intake conduit (204) and injected fuel quantity control depending on engine speed, throttle demand, coolant temperature and atmospheric pressure etc. For engine out emission control, a suitable compression ratio is selected. The bowl shape, injector nozzle, injection pressures, injections parameters and cylinder head swirl are chosen after studying interaction effect with intention to minimize engine out emissions. The volatile organic fractions of engine out emissions are further oxidized in diesel oxidation catalyst (202). Tail pipe emissions under steady state (NRSC), NTE and transient cycle (NRTC) are controlled by combination of engine hardware and with calibration of injection parameters and exhaust gas recirculation rate. Corrections in base map are done based on coolant temperature and ambient pressure. Emission control is achieved with open loop system. In an embodiment a transient calibration is performed on the engine to get optimum NOx/PM trade off throughout the engine map meeting the cycle BSFC targets. Rail pressure, start of main injection, start of pilot injection and the quantity, exhaust gas recirculation rate over entire engine map, and water temperature based corrections in exhaust gas recirculation flow rate are tuned to calibrate the engine.

The exhaust gas recirculation cooler (215) is provided in fluid communication with the air intake conduit (204) through the exhaust gas recirculation valve (210) and the exhaust gas mixing conduit (214). One end of the exhaust gas recirculation cooler (215) is connected to the exhaust manifold (206) and the other end of the exhaust gas recirculation cooler (215) is coupled to the exhaust gas recirculation valve (210).

Figure 6:
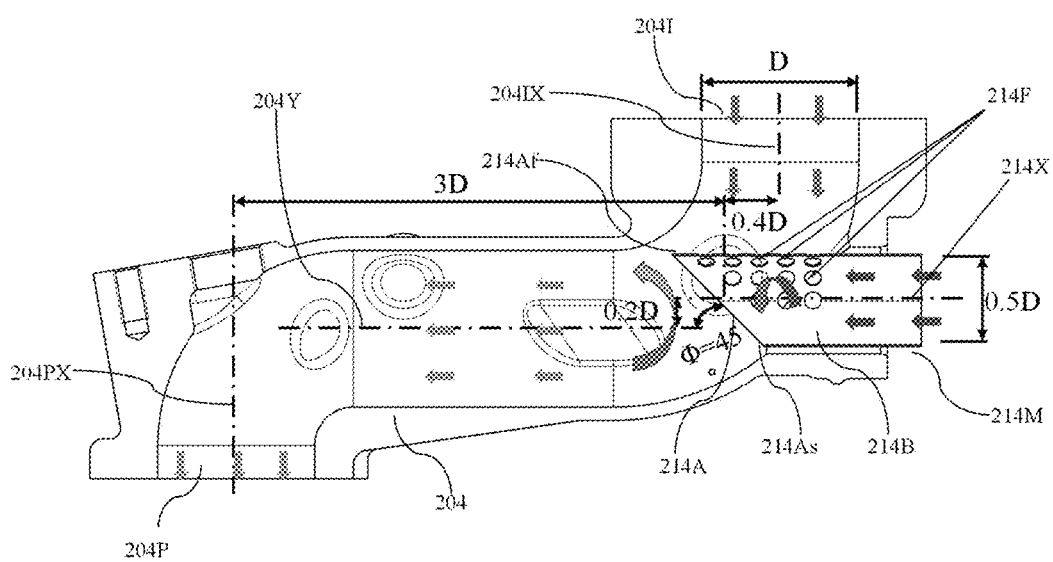
FIG. 6 depicts a cross sectional view of an air intake conduit and an exhaust gas mixing conduit in assembled condition, according to the second embodiment as disclosed herein.

FIG. 6 depicts a cross sectional view of an air intake conduit (104) and an exhaust gas mixing conduit (114) in assembled condition, according to the second embodiment as disclosed herein. The exhaust gas mixing conduit (214) receives exhaust gas from the exhaust gas recirculation cooler (215) through the exhaust gas recirculation valve (210). One end of the exhaust gas mixing conduit (214) is coupled to the exhaust gas recirculation valve (210) and the other end of the exhaust gas mixing conduit (214) is connected to the air intake conduit (204). The exhaust gas mixing conduit (214) includes a body (214B), where at least a portion of the body (214B) of the exhaust gas mixing conduit (214) is disposed inside the air intake conduit (204) along the path of fresh air flow from an air inlet (204I) of the air intake conduit (204). In the second embodiment, the exhaust gas mixing conduit (214) includes a plurality of fresh air inlets (214F) adapted to facilitate entry of fresh air from the air inlet (204I) of the air intake conduit (204) into the exhaust gas mixing conduit (214) therein to facilitate uniform mixing of fresh air with exhaust gas in the exhaust gas mixing conduit (214). For the purpose of this description and ease of understanding, each fresh air inlet (214F) is considered to be an opening. The plurality of fresh air inlets (214F) of the exhaust gas mixing conduit (214) is provided to the body (214B) of the exhaust gas mixing conduit (214). The plurality of fresh air inlets (214F) of the exhaust gas mixing conduit (214) is disposed in the path of flow of fresh air from the air inlet (104I) of the air intake conduit (214). The number of fresh air inlets (214F) provided in the exhaust gas mixing conduit (214) is 29. It is also within the scope of this invention to provide the exhaust gas mixing conduit (214) with any number of fresh air inlets (214F). In an embodiment, the diameter of each fresh air inlet (214F) of the exhaust gas mixing conduit (214) is 0.1 of the inner diameter (D) of the air intake conduit (204). It is also within the scope of this invention to provide the diameter of each fresh air inlet (214F) of the exhaust gas mixing conduit (214) in any other number.

In the second embodiment, the exhaust gas mixing conduit (214) includes an angular fluid outlet (214A, as shown in FIG. 6) adapted to dispense the mixed fluid from the exhaust gas mixing conduit (214) to the air intake conduit (204), where the angular fluid outlet (214A) is provided at the end of the body (214B), One end (214Af) of the angular exhaust gas outlet (214A) is disposed away from another end (214As) of the angular fluid outlet (214A). In an embodiment, the exhaust gas mixing conduit (214) is being cut at a predefined angle with respect to a central axis (214X, as shown in FIG. 6) of the exhaust gas mixing conduit (214) therein to form the angular fluid outlet (214A). For example, the exhaust gas mixing conduit (214) is being cut at 45 degree with respect to the central axis (214X) of the exhaust gas mixing conduit (214) therein to form the angular fluid outlet (214A). However, it is also within the scope of this invention to cut the exhaust gas mixing conduit (214) at any other angle without otherwise deterring the intended function of the angular fluid outlet (214A) as can be deduced from the description and corresponding drawings.

In an embodiment, an inner diameter of the exhaust gas mixing conduit (214) is half the inner diameter (D, as shown in FIG. 6) of the air intake conduit (204). It is also within the scope of this invention to provide the inner diameter of the exhaust gas mixing conduit (214) in any other number. In an embodiment, a distance between the center of angular fluid outlet (214A) of the exhaust gas mixing conduit (214) and the central axis (204IX) of the inlet (204I) of the air intake conduit (204) is 0.4 of the inner diameter (D) of the air intake conduit (204). It is also within the scope of this invention to change the distance between the center of angular fluid outlet (214A) of the exhaust gas mixing conduit (214) and the central axis (204IX) of the inlet (204I) of the air intake conduit (204). In an embodiment, a distance between the central axis (214X) of the exhaust gas mixing conduit (214) and a longitudinal axis (204Y, as shown in FIG. 6) of the air intake conduit (204) is 0.2 of inner diameter (D) of the air intake conduit (204). It is also within the scope of this invention to change the distance between the central axis (214X) of the exhaust gas mixing conduit (214) and the longitudinal axis (204Y) of the air intake conduit (204). In an embodiment, a distance between the center of the angular fluid outlet (214A) of the exhaust gas mixing conduit (214) and a central axis (204PX, as shown in FIG. 6) of an outlet (204P, as shown in FIG. 6) of the air intake conduit (204) is 3 times the inner diameter (D) of the air intake conduit (204). It is also within the scope of this invention to change the distance between the center of the angular fluid outlet (214A) of the exhaust gas mixing conduit (214) and the central axis of the outlet (204P) of the air intake conduit (204). The aforementioned dimensions are derived based on the inner diameter (D) of the air intake conduit (204) to achieve flow uniformity index of >90%.

The exhaust gas mixing conduit (214) includes a mounting bracket (214M, as shown in FIG. 6) adapted to mount the exhaust gas mixing conduit (214) onto the air intake conduit (204), where the mounting bracket (214M) is adapted to facilitate fastening of the exhaust gas mixing conduit (214) with the air intake conduit (204). The mounting bracket (214M) is welded to the exhaust gas mixing conduit (214). It is also within the scope of this invention to connect the mounting bracket (214M) by any other connecting process. The exhaust gas mixing conduit (214) is secured to the air intake conduit (204) by using fasteners (not shown). For example, mounting bracket (214M) is fastened to the air intake conduit (204) by using fasteners (not shown) thereby securing the exhaust gas mixing conduit (214) to the air intake conduit (204).

Figure 7:
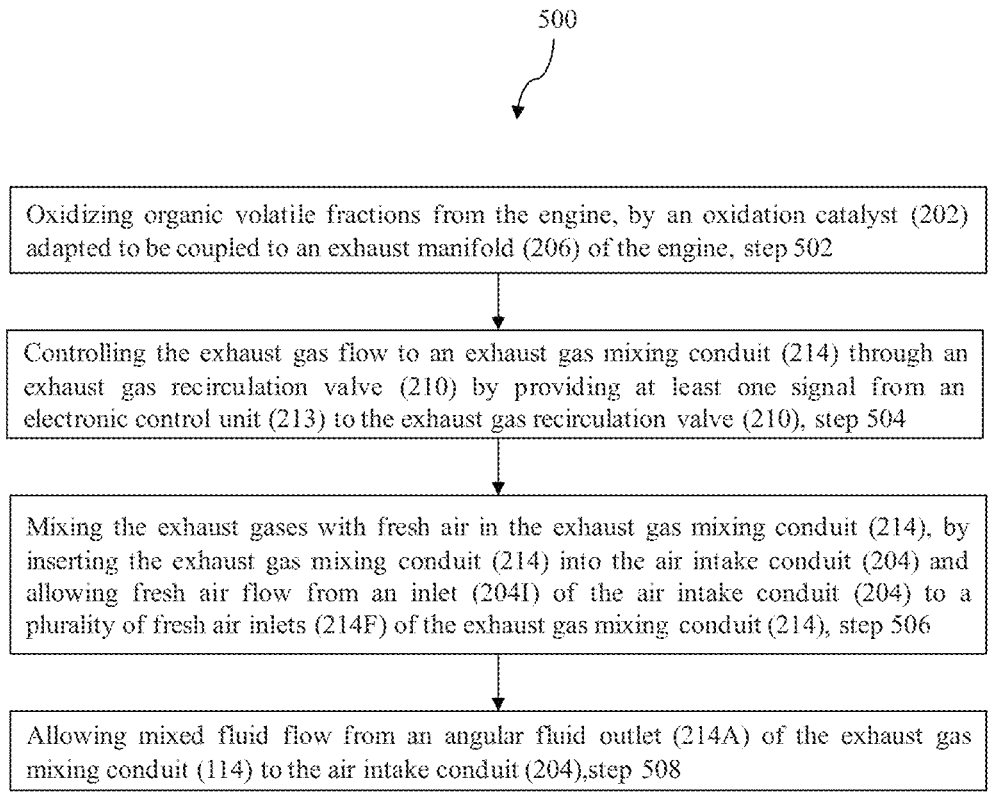
FIG. 7 depicts a flowchart indicating a method for controlling exhaust gas emissions from the naturally aspirated engine, according to the second embodiment as disclosed herein.

FIG. 7 depicts a flowchart indicating a method (500) for controlling exhaust gas emissions from the naturally aspirated engine, according to the second embodiment as disclosed herein. For the purpose of this description and ease of understanding, the method (500) is explained herein below with reference to controlling exhaust gas emissions from a naturally aspirated common rail diesel engine. It is also within the scope of the invention to practice/implement the entire steps of the method (500) in a same manner or in a different manner or with omission of at least one step of the method (500) or with any addition of at least one step to the method (500) controlling exhaust gas emissions from any other type of engines. In the second embodiment, the method (500) includes, oxidizing organic volatile fractions from the engine, by an oxidation catalyst (202) adapted to be coupled to an exhaust manifold (206) of the engine, step 502; controlling the exhaust gas flow to an exhaust gas mixing conduit (214) through an exhaust gas recirculation valve (210) by providing at least one signal from an electronic control unit (213) to the exhaust gas recirculation valve (210), step 504; mixing the exhaust gases with fresh air in the exhaust gas mixing conduit (214), by inserting the exhaust gas mixing conduit (214) into the air intake conduit (204) and allowing fresh air flow from an inlet (204I) of the air intake conduit (204) to a plurality of fresh air inlets (214F) of the exhaust gas mixing conduit (214), step 506; and allowing mixed fluid flow from an angular fluid outlet (214A) of the exhaust gas mixing conduit (114) to the air intake conduit (204), step 508. Further, the method (500) includes, selecting the oxidation catalyst (102) from a combination of precious metal, wherein the precious metal comprises platinum (Pt) and palladium (Pd).

Figure 8:
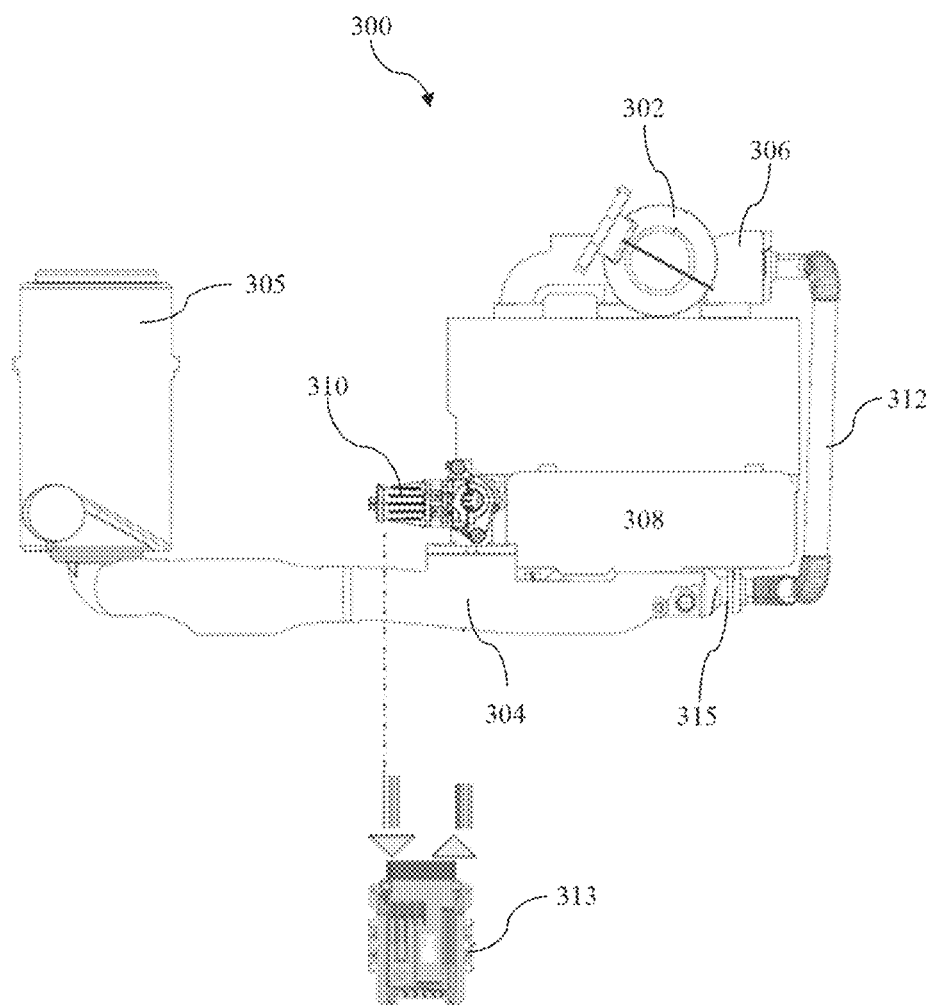
FIG. 8 depicts a schematic view of an emission control system in communication with a naturally aspirated engine, according to a third embodiment as disclosed herein.

FIG. 8 depicts a schematic view of an emission control system (300) in communication with an engine, according to a third embodiment as disclosed herein. In the third embodiment, the system (300) includes a diesel oxidation catalyst (302), an air intake venturi conduit (304), an exhaust manifold (306), an intake manifold (308), an exhaust gas recirculation valve (310), an exhaust gas recirculation pipe (312), an electronic control unit (313), an exhaust gas mixing conduit (314) and an exhaust gas recirculation cooler (315). For the purpose of this description and ease of understanding, the system (300) is explained herein with reference to controlling exhaust gas emissions from a naturally aspirated common rail diesel engine. However, it is also within the scope of this invention to practice/implement the system (300) for controlling exhaust gas emissions from any other type of engine without otherwise deterring the intended function of the system (300) as can be deduced from the description and corresponding drawings.

The diesel oxidation catalyst (302) is connected to the exhaust manifold (306). The diesel oxidation catalyst (302) is mounted on or near the exhaust manifold (306) to oxidize organic volatile fractions of exhaust emissions from engine. This oxidation reaction in diesel oxidation catalyst (302) helps to reduce tail pipe hydrocarbons (HC) and carbon mono oxide (CO) emissions as well it reduces particulate matter (PM) due to oxidation of volatile organic fractions. The close coupled diesel oxidation catalyst (302) mounted on exhaust manifold (106) helps for faster activation of diesel oxidation catalyst even at light loads. A combination of precious metals (Platinum (Pt.)+Palladium (Pd.)) in right proportion and loading ensures meeting legal emission demand over the entire usefill life of the engine. The normal exhaust gas temperature for naturally aspirated diesel engine is 200-650 degree Celsius. The light-off temperature of diesel oxidation catalyst is around 250 degree Celsius. Palladium (Pd.) gives better thermal stability at high gas temperature operation whereas Platinum (Pt.) helps for faster activation at light load. For this application, a predetermined ratio of Pt:Pd combination is used for controlling the particulate matter (PM) emissions throughout the engine operation.

Figure 9:
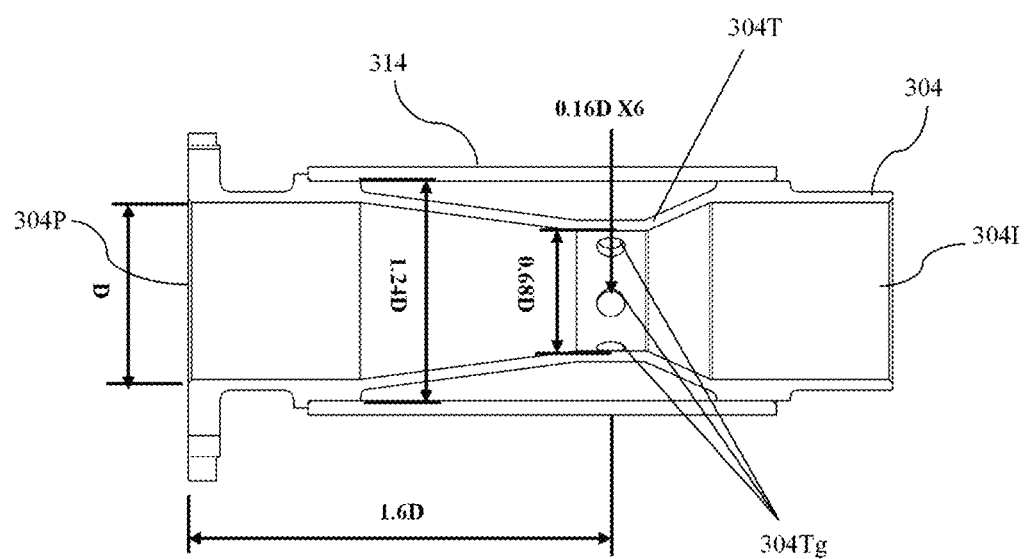
FIG. 9 depicts a cross sectional view of an air intake venturi conduit and an exhaust gas mixing conduit in assembled condition, according to the third embodiment as disclosed herein.
Figure 10:
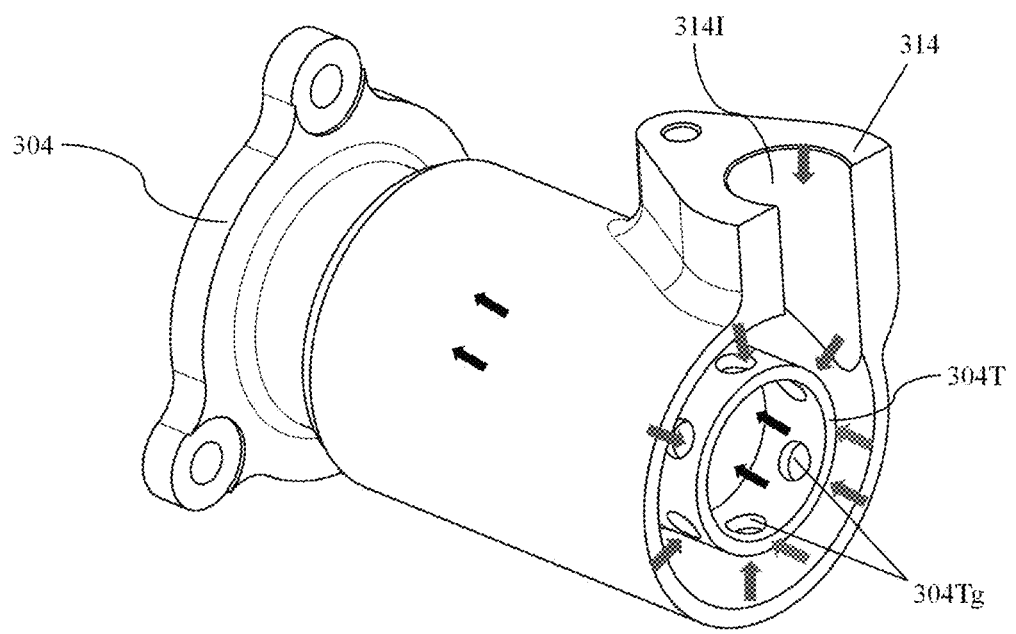
FIG. 10 depicts another cross sectional view of the air intake venturi conduit and the exhaust gas mixing conduit in assembled condition, according to the third embodiment as disclosed herein.

FIG. 9 depicts a cross sectional view of an air intake venturi conduit (304) and an exhaust gas mixing conduit (314) in assembled condition, according to the third embodiment as disclosed herein. FIG. 10 depicts another cross sectional view of the air intake venturi conduit (304) and the exhaust gas mixing conduit (314) in assembled condition, according to the third embodiment as disclosed herein. One end of the air intake venturi conduit (304) is coupled to the air cleaner (305) and another end of the air intake venturi conduit (304) is connected to the intake manifold (108). The air intake venturi conduit (304) is adapted to allow fresh air from the air cleaner (305) to the intake manifold (308). The air intake venturi conduit (304) receives re-circulated exhaust gas from the exhaust gas mixing conduit (314) and the air intake venturi conduit (304) facilitates in mixing of the exhaust gas with the fresh air. In the third embodiment, the air intake venturi conduit (304) is adapted to be provided in fluid communication with the intake manifold (308) and the air cleaner (305). The air intake venturi conduit (304) includes an inlet (304I), a throat portion (304T) and an outlet (304P). The inlet (304I) of the air intake venturi conduit (304) is adapted to facilitate entry of fresh air from the air cleaner (305) to the air intake venturi conduit (304). The throat portion (304I) of the air intake venturi conduit (304) defines a plurality of exhaust gas receiving portions (304Tg) adapted to facilitate entry of exhaust gas from the exhaust gas mixing conduit (314) to the air intake venturi conduit (304) therein to enable uniform mixing of exhaust gas with flesh air in the air intake venturi conduit (304). For the purpose of this description and ease of understanding, each exhaust gas receiving portion (304Tg) is considered to be opening. It is also within the scope of this invention to provide at least one least one exhaust gas receiving portion (304Tg) to the throat portion (304T) of the air intake venturi conduit (304). In the third embodiment, a diameter of each exhaust gas receiving portion (304Tg) is 0.16 of the inner diameter (D) of the air intake venturi conduit (304). It is also within the scope of this invention to provide the diameter of exhaust gas receiving portion (304Tg) in any other number. The number of exhaust gas receiving portions (304Tg) provided on the throat portion (304T) of the air intake venturi conduit (304) is at least 6. It is also within the scope of this invention to provide any number of exhaust gas receiving portions (304Tg) on the throat portion (304T) of the air intake venturi conduit (304). A diameter of the throat portion (304T) of the air intake venturi conduit (304) is 0.68 of the inner diameter (D) of the air intake venturi conduit (304). The outlet (304P) of the air intake venturi conduit (304) is adapted to facilitate exit of mixed fluid from the air intake venturi conduit (304) to the air intake manifold (308). A distance between the outlet (304P) and the center of the throat portion (304T) of the air intake venturi conduit (304) is 1.6 times the inner diameter (D) of the air intake venturi conduit (304). It is also within the scope of this invention to change the distance between the outlet (304P) and the center of the throat portion (304T) of the air intake venturi conduit (304). The structural design of the air intake venturi conduit (304) is adapted to reduce packaging size of the air intake system. The exhaust gas flows from the exhaust gas mixing conduit (314) to the air intake venturi conduit (304) even during low exhaust back pressure condition.

The exhaust manifold (306) is provided. In fluid communication with the exhaust gas recirculation cooler (315) through the exhaust gas recirculation pipe (312). One end of the exhaust manifold (306) is connected to an exhaust side of the engine and the other end of the exhaust manifold (306) is connected to the exhaust gas recirculation pipe (312). The intake manifold (308) is provided in fluid communication with the air cleaner (305) through the air intake venturi conduit (304). One end of the intake manifold (308) is connected to the air intake venturi conduit (304) and the oilier ends of the intake manifold (308) are connected to an intake side of the engine.

The exhaust gas recirculation valve (310) is provided in fluid communication with the air intake venturi conduit (304) through the exhaust gas mixing conduit (314). The exhaust gas recirculation valve (310) is provided in fluid communication with the exhaust gas recirculation cooler (315). The exhaust gas recirculation valve (310) provided near a cold side or a hot side of the exhaust gas recirculation cooler (315). The exhaust gas recirculation valve (310) is adapted to control the flow of exhaust gas recirculation to the air intake venturi conduit (304) based on the information received from the electronic control unit (313). The flow control of exhaust gas recirculation is open loop. The exhaust gas recirculation valve (310) opening is based on calibrated exhaust gas recirculation map controlled through electronic control unit (313) to maintain the level of particulates emitted in the exhaust gas within prescribed limits. One end of the exhaust gas recirculation pipe (312) is connected to the exhaust manifold (306) and the other end of the exhaust gas recirculation pipe (312) is connected to the exhaust gas recirculation cooler (315).

The electronic control unit (313) specifically includes open loop control logic to provide a regulated flow of exhaust gas recirculation into the air intake venturi conduit (304) and injected fuel quantity control depending on engine speed, throttle demand, coolant temperature and atmospheric pressure etc. For engine out emission control, a suitable compression ratio is selected. The bowl shape, injector nozzle, injection pressures, injections parameters and cylinder head swirl are chosen after studying interaction effect with intention to minimize engine out emissions. The volatile organic fractions of engine out emissions are further oxidized in diesel oxidation catalyst (302). Tail pipe emissions under steady state (NRSC), NTE and transient cycle (NRTC) are controlled by combination of engine hardware and with calibration of injection parameters and exhaust gas recirculation rate. Corrections in base map are done based on coolant temperature and ambient pressure. Emission control is achieved with open loop system. In an embodiment a transient calibration is performed on said engine to get optimum NOx/PM trade off throughout the engine map meeting the cycle BSFC targets. Rail pressure, start of main injection, start of pilot injection and the quantity, exhaust gas recirculation rate over entire engine map, and water temperature based corrections in exhaust gas recirculation flow rate are tuned to calibrate the engine.

The exhaust gas recirculation cooler (315) is provided in fluid communication with the air intake venturi conduit (304) through the exhaust gas recirculation valve (310) and the exhaust gas mixing conduit (314). One end of the exhaust gas recirculation cooler (315) is connected to the exhaust manifold (306) and the other end of the exhaust gas recirculation cooler (115) is coupled to the exhaust gas recirculation valve (310).

In the third embodiment, the exhaust gas mixing conduit (314) is disposed concentrically onto the air intake venturi conduit (304), where a longitudinal axis of the exhaust gas mixing conduit (314) is coaxial to a longitudinal axis of the air intake venturi conduit (304). The exhaust gas mixing conduit (314) is a tubular member concentrically disposed onto the air intake venturi conduit (314). The exhaust gas mixing conduit (314) includes an exhaust gas inlet (3141, as shown in FIG. 10) adapted to facilitate entry of exhaust gas from the exhaust gas recirculation (EGR) valve (110) to the exhaust gas mixing conduit (314). The diameter of exhaust gas inlet (3141) of the exhaust gas mixing conduit (314) is half the inner diameter (D) of the air intake venturi conduit (314). It is also within the scope of this invention to provide the diameter of exhaust gas inlet (3141) of the exhaust gas mixing conduit (314) in any other number. An inner diameter of the exhaust gas mixing conduit (314) is 1.24 times the inner diameter (D) of the air intake venturi conduit (304). It is also within the scope of this invention to provide the inner diameter of the exhaust gas mixing conduit (314) in any other number. The aforementioned dimensions are derived based on the inner diameter (D) of the air intake venturi conduit (304) to achieve flow uniformity index of >90%.

FIG. 11 depicts a flowchart indicating a method (600) for controlling exhaust gas emissions from the naturally aspirated engine, according to the third embodiment as disclosed herein. For the purpose of this description and ease of understanding, the method (600) is explained herein below with reference to controlling exhaust gas emissions from a naturally aspirated common rail diesel engine. It is also within the scope of the invention to practice/implement the entire steps of the method (600) in a same manner or a different manner or with omission of at least one step of the method (600) or with any addition of at least one step to the method (600) for controlling exhaust gas emissions from any other type of engines. In the third embodiment, the method (600) includes, oxidizing organic volatile fractions from the engine, by an oxidation catalyst (302) adapted to be coupled to an exhaust manifold (306) of the engine, step 602; controlling the exhaust gas flow to an exhaust gas mixing conduit (314) through an exhaust gas recirculation valve (310) by providing at least one signal from an electronic control unit (313) to the exhaust gas recirculation valve (310), step 604; and mixing the exhaust gases with fresh air in the air intake venturi conduit (304), by allowing exhaust gas flow from the exhaust gas mixing conduit (214) to a plurality of plurality of exhaust gas receiving portion (304Tg) provided to a throat portion (304T) of the air intake venturi conduit (304), step 606. The method (600) comprises, selecting the oxidation catalyst (102) from a combination of precious metal, wherein the precious metal comprises platinum (Pt) and palladium (Pd). Further, the method (600) comprises mounting the exhaust gas mixing conduit (314) concentrically onto the air intake venturi conduit (304).

Figure 12A:
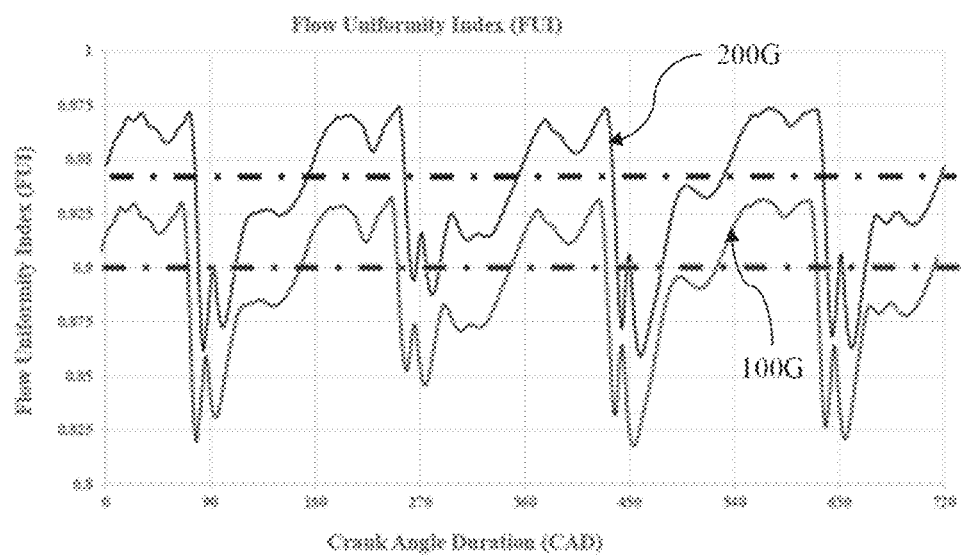
FIG. 12a depicts a graph plot between flow uniformity index of exhaust gas recirculation and crank angle duration of engines, according to the first and second embodiment as disclosed herein.

FIG. 12a depicts a graph plot between flow uniformity index (FUI) of exhaust gas re-circulation and crank angle duration of the engines, according to the first and second embodiment as disclosed herein. The curve 100G in the graph indicates graph plot between the flow uniformity index of exhaust gas re-circulation and the crank angle duration of engine. Thus from FIG. 12a it is clearly evident that the flow uniformity index of exhaust gas re-circulation in the emission control system (100) is >85%. The curve 200G in the graph indicates the graph plot between flow uniformity index of exhaust gas re-circulation and the crank angle duration of engine. Thus from FIG. 12a it is clearly evident that the flow uniformity index of exhaust gas re-circulation in the emission control system (200) is >90%.

Figure 12B:
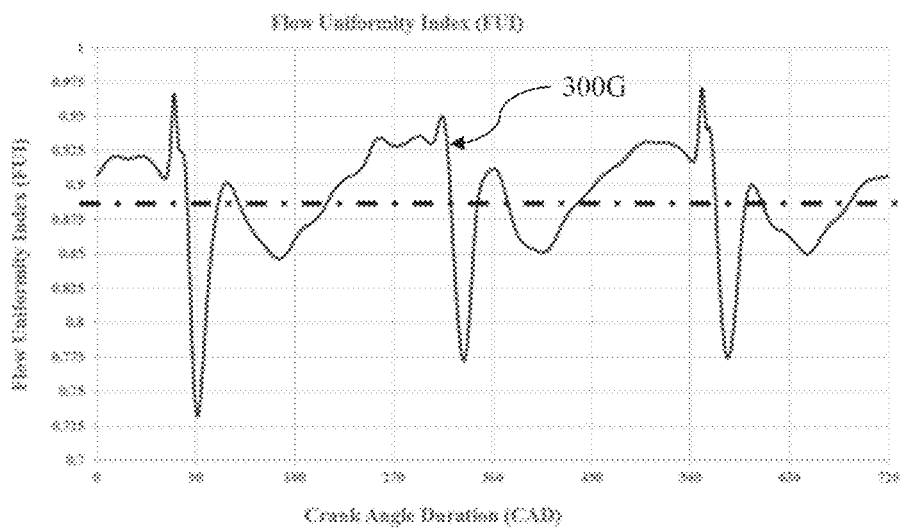
FIG. 12b depicts a graph plot between flow uniformity index of exhaust gas recirculation and crank angle duration of engine, according to the third embodiment as disclosed herein.

FIG. 12b depicts a graph plot between flow uniformity index (FUI) of exhaust gas re-circulation and crank angle duration of the engine, according to the third embodiment as disclosed herein. The curve 300G in the graph indicates the graph plot between flow uniformity index of exhaust gas re-circulation and the crank angle duration of engine. Thus from FIG. 12a it is clearly evident that the flow uniformity index of exhaust gas re-circulation in the emission control system (300) is >90%.

It is also within the scope of this invention to transversely insert the exhaust gas mixing conduit into the throat portion (304T) of the air intake venturi conduit (304).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A system for controlling exhaust gas emissions from a naturally aspirated engine, said system comprising:
   an oxidation catalyst adapted to be coupled to an exhaust manifold of the engine;
   an air intake venturi conduit having an inlet, a throat portion and an outlet;
   an exhaust gas mixing conduit adapted to be provided in fluid communication with the throat portion of said air intake venturi conduit; and
   an exhaust gas recirculation valve provided in fluid communication with said exhaust manifold and said exhaust gas mixing conduit,
   wherein
   said exhaust gas recirculation valve is adapted to control the flow of exhaust gas recirculation to said exhaust gas mixing conduit based on at least one signal received from an electronic control unit;
   said exhaust gas mixing conduit is disposed concentrically onto the air intake venturi conduit, where a longitudinal axis of said exhaust gas mixing conduit is coaxial to a longitudinal axis of said air intake venturi conduit;
   a diameter of each exhaust gas receiving portion of said throat portion of said air intake venturi conduit is 0.16 of the inner diameter (D) of said air intake venturi conduit;
   an inner diameter of said throat portion of said air intake venturi conduit is 0.68 of the inner diameter (D) of said air intake venturi conduit;
   said throat portion of said aft intake venturi conduit defines a plurality of exhaust gas receiving portion adapted to facilitate entry of exhaust gas from said exhaust gas mixing conduit to said aft intake venturi conduit, a diameter of said exhaust gas inlet of said exhaust gas mixing conduit is half the inner diameter (D) of said aft intake venturi conduit, and an inner diameter of said exhaust gas mixing conduit is 1.24 times the inner diameter (D) of said air intake venturi conduit therein to enable uniform mixing of exhaust gas with fresh air in said air intake venturi conduit; and
   said electronic control unit includes an open loop control logic to provide a regulated flow of exhaust gas recirculation to the engine.

2. The system as claimed in claim 1, wherein said exhaust gas recirculation valve is provided near a cold side or a hot side of an exhaust gas recirculation cooler; and
   said exhaust gas recirculation valve is provided in fluid communication with the exhaust manifold through the exhaust gas recirculation cooler and an exhaust gas recirculation pipe.

3. The system as claimed in claim 1, wherein said oxidation catalyst is selected from a combination of precious metal, wherein the precious metal comprises platinum (Pt) and palladium (Pd).

4. The system as claimed in claim 1, wherein a distance between the outlet and the center of the throat portion of the air intake venturi conduit is 1.6 times the inner diameter (D) of the air intake venturi conduit.

\* \* \* \* \*